US012791908B2

(12) United States Patent
Müller-Ott et al.

(10) Patent No.: US 12,791,908 B2
(45) Date of Patent: Nov. 10, 2026

(54) PREVENTING BRAGG GRATING FORMATION IN A NONLINEAR CRYSTAL IN A LINEAR RESONATOR

(71) Applicant: Coherent LaserSystems GmbH & Co. KG, Göttingen (DE)

(72) Inventors: Natalia Müller-Ott, Lübeck (DE); Jens Bracht, Osterrönfeld (DE); Frank Kallmeyer, Bad Schwartau (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 198 days.

(21) Appl. No.: 18/737,545

(22) Filed: Jun. 7, 2024

(65) Prior Publication Data

US 2024/0427215 A1 Dec. 26, 2024

(30) Foreign Application Priority Data

Jun. 20, 2023 (EP) .................................... 23180409

(51) Int. Cl.
*G02F 1/35* (2006.01)
*G02F 1/355* (2006.01)
*G02F 1/37* (2006.01)

(52) U.S. Cl.
CPC .......... *G02F 1/3507* (2021.01); *G02F 1/3551* (2013.01); *G02F 1/37* (2013.01)

(58) Field of Classification Search
CPC ......... G02F 1/3507; G02F 1/3551; G02F 1/37
See application file for complete search history.

(56) References Cited

U.S. PATENT DOCUMENTS 5,289,491 A 2/1994 Dixon
9,031,114 B1 5/2015 Von Elm
(Continued)

FOREIGN PATENT DOCUMENTS

CN 103682972 A * 3/2014 ............ G02F 1/353
CN 121693833 A * 3/2026 ............ H01S 3/083
(Continued)

OTHER PUBLICATIONS

Extended European Search Report and Written Opinion received for European Patent Application No. 23180409.7 mailed on Dec. 1, 2023, 9 pages.

(Continued)

*Primary Examiner* — Rhonda S Peace
(74) *Attorney, Agent, or Firm* — TraskBritt

(57) ABSTRACT

A method for frequency conversion in a single-longitudinal-mode linear resonator includes frequency converting intracavity laser radiation in a nonlinear crystal disposed in a linear resonator. The intracavity laser radiation is in a single longitudinal mode of the resonator and forms a standing wave between its end-mirrors. The method also includes repeatedly sweeping the standing wave back and forth, along an optical axis of the resonator, relative to the nonlinear crystal. This repeated sweeping may be achieved by dithering the longitudinal position of (a) one or both of the end-mirrors or (b) the nonlinear crystal. Dithering of a single end-mirror may be driven by modulating a reference wavelength to which the wavelength of the intracavity laser radiation is locked. Dithering of the longitudinal position of the nonlinear crystal may be achieved with a piezoelectric actuator arranged to adjust angles of a parallelogram-shaped flexure to which the nonlinear crystal is mounted.

19 Claims, 7 Drawing Sheets

(56) References Cited

U.S. PATENT DOCUMENTS

| | | | | |
|---|---|---|---|---|
| 10,852,621 | B1 * | 12/2020 | Boland | H01S 3/06754 |
| 2010/0321765 | A1 * | 12/2010 | Caprara | H01S 5/141 359/328 |
| 2017/0244214 | A1 | 8/2017 | Kannengiesser | |
| 2024/0427215 | A1 * | 12/2024 | Müller-Ott | G02F 1/3551 |

FOREIGN PATENT DOCUMENTS

| | | | |
|---|---|---|---|
| EP | 0429319 | A1 | 1/1994 |
| EP | 2466372 | A1 | 6/2012 |

OTHER PUBLICATIONS

International Search Report and Written Opinion received for International Patent Application No. PCT/EP2024/066475 mailed on Jul. 19, 2024, 12 pages.

* cited by examiner

PREVENTING BRAGG GRATING FORMATION IN A NONLINEAR CRYSTAL IN A LINEAR RESONATOR

CROSS-REFERENCE TO RELATED APPLICATIONS

This application claims the priority of European Patent Application No. 23180409.7, filed on Jun. 20, 2023, the entire contents of which are incorporated herein by reference.

TECHNICAL FIELD

The present disclosure relates in general to frequency conversion in a solid-state crystal in a linear resonator. The present disclosure relates in particular to scenarios where the intracavity power is high and the linear resonator is operated on a single longitudinal mode.

DISCUSSION OF BACKGROUND ART

The efficiency of frequency doubling of fundamental laser radiation is proportional to the square of the intensity of the fundamental laser radiation, at least in the absence of other factors such as thermal effects and depletion of the fundamental laser radiation. It is therefore often advantageous to perform the frequency doubling in an optical resonator for the fundamental laser radiation. Constructive interference between many passes of the fundamental laser radiation inside the resonator enhances the intensity of the fundamental laser radiation. The enhancement factor may be as large as 100, for example. Sum-frequency and difference-frequency mixing of two different wavelengths may similarly benefit from being performed in a resonator that enhances the intensity of laser radiation at one of the two input wavelengths, although the frequency-conversion efficiency in these cases only scales linearly with the intensity of the resonantly enhanced laser radiation.

Enhancement of fundamental laser radiation, for the purpose of efficient frequency conversion, may take place in a dedicated resonant enhancement cavity. The input (e.g., fundamental) laser radiation is coupled into the resonant enhancement cavity from an external laser source, and the nonlinear crystal is placed inside the resonant enhancement cavity. In another approach, known as intracavity frequency-conversion, the nonlinear crystal is placed directly inside the laser resonator that generates the input laser radiation.

There are two types of optical resonators: linear resonators and ring resonators. In a linear resonator, laser radiation propagates back and forth between two end-mirrors. Unless special techniques are employed to ensure otherwise, interference between the forward- and backward-propagating light waves causes the laser radiation to form a standing wave between the two end-mirrors. Boundary conditions force the standing wave to have nodes at the end-mirrors. In this manner, the linear resonator can support oscillation of a discrete set of different longitudinal modes, each characterized by a different number of antinodes along the length of the linear resonator and thus a different wavelength. If necessary, single-longitudinal-mode operation can be forced by introducing a loss that is smaller for the desired longitudinal mode than other longitudinal modes.

A ring resonator has no end-mirrors. Instead, laser radiation propagates continuously around a closed loop. Laser radiation may propagate in either one of the two opposite directions around the closed loop. However, most commonly, the ring resonator includes an optical diode that limits propagation to one direction around the closed loop. In this unidirectional case, there is no interference between counter-propagating waves, and the laser radiation forms a travelling wave in the ring resonator.

Linear resonators and ring resonators each have their advantages and disadvantages. For example, the optical diode used in the majority of ring resonators adds complexity, can be expensive, and usually imposes a loss. Ring resonators are also typically more difficult to build and align than linear resonators. On the other hand, the standing-wave pattern of linear resonators can be disadvantageous. In solid-state laser resonators, for example, the spatial intensity variation of the standing wave can cause spatial hole burning in the solid-state laser gain medium. Spatial hole burning tends to reduce the laser efficiency and can lead to other undesirable effects, including mode-hopping between different longitudinal modes.

When single-longitudinal-mode operation is not required, the intensity variation in the standing wave pattern can be reduced through simultaneous oscillation at several different longitudinal modes. In single-longitudinal-mode operation, the standing wave pattern can be eliminated in the laser gain medium by the so-called twisted-mode technique. In the twisted-mode technique, quarter-wave plates before and after the laser gain medium rotate the polarization such that the counter-propagating waves in the laser gain medium have orthogonal circular polarizations and therefore do not interfere with each other.

Many nonlinear crystals are photorefractive. A photorefractive material subjected to spatially non-uniform laser irradiation of sufficient intensity will develop a spatial nonuniformity in its refractive index, caused by a migration of electrons from more brightly irradiated areas to darker areas. The nonuniform refractive index remains after turning off the laser irradiation. This effect is utilized in the writing of Bragg gratings, for example in holography. The Bragg gratings may be erased by raising the temperature of the photorefractive material above its annealing temperature.

BRIEF SUMMARY

Disclosed herein are methods for frequency conversion of laser radiation in a linear resonator operated on a single longitudinal mode. The disclosed methods are applicable to both intracavity frequency conversion and frequency conversion in resonant enhancement cavities. The methods are designed for compatibility with single-longitudinal-mode operation of the linear resonator at a high intracavity average-power, for example at several hundred watts or more. We have realized that, in scenarios with high intracavity average-power, the standing wave in the linear resonator may be sufficiently intense to create a Bragg grating in the nonlinear crystal. The Bragg grating becomes functionally a partial mirror, which creates multiple coupled resonators within the linear resonator and challenges maintaining a single desired longitudinal mode. Many laser applications are intolerant of mode-hops and multimode operation, particularly applications that use the laser radiation for interferometry.

To prevent Bragg grating formation in the intracavity nonlinear crystal, the present methods include repeatedly sweeping the longitudinal position of the standing wave, along the optical axis of the linear resonator, relative to the nonlinear crystal. This sweeping is achieved in any one of several different ways, including (a) dithering the longitudinal position of one or both end-mirrors of the linear resonator, (b) dithering the longitudinal position of the nonlinear crystal, and (c) dithering the temperature of a transmissive intracavity optical element. Any one of these solutions is capable of maintaining the longitudinal mode while preventing Bragg grating formation in the nonlinear crystal. Unlike, e.g., the twisted-mode technique, the present methods for preventing Bragg grating formation do not rely on the elimination of the interference between forward- and backward-propagating radiation. This interference remains but the resulting standing wave is repeatedly swept back and forth to spatially smear the impact that the standing wave may have on the nonlinear crystal through the photorefractive effect. As a result, the intracavity radiation may be of the same linear polarization throughout the linear resonator.

In one aspect of the disclosure, a method for frequency conversion in a single-longitudinal-mode linear resonator includes frequency converting at least a portion of intracavity laser radiation in a first nonlinear crystal disposed in a linear resonator. The intracavity laser radiation is in a single longitudinal mode of the linear resonator and forms a standing wave between first and second end-mirrors of the linear resonator. The method also includes repeatedly sweeping the standing wave back and forth, along an optical axis of the linear resonator, relative to the first nonlinear crystal.

In another aspect of the disclosure, an actuator for translating a nonlinear crystal along an optical axis includes a base, a flexure, an arm, and a piezoelectric transducer. The flexure includes first, second, third, and fourth legs, the first leg being affixed to or integrally formed with the base. The first and second legs are oriented along a first dimension. Each of the third and fourth legs interconnects the first and the second legs, and the third and fourth legs are offset from each other in the first dimension, whereby the first, second, third, and fourth legs cooperate to form a parallelogram. Connections between the first, second, third, and fourth legs are less rigid than the first, second, third, and fourth legs. The arm extends away from the first leg, the second leg, or the base in a direction orthogonal to the first dimension. The piezoelectric transducer is coupled between the arm and the third leg such that extension of the piezoelectric transducer changes angles of the parallelogram to translate the second leg along the first dimension.

In yet another aspect of the disclosure, a method for frequency conversion in a linear resonator includes a step of frequency converting at least a portion of intracavity laser radiation in a first nonlinear crystal disposed in a linear resonator. The intracavity laser radiation is in a single longitudinal mode of the linear resonator and forms a standing wave between first and second end-mirrors of the linear resonator. The method further includes a step of locking a wavelength of the intracavity laser radiation to a reference wavelength by adjusting position of a single one of the first and second end-mirrors. The method also includes a step of modulating the reference wavelength, whereby the locking step causes modulation of the wavelength of the intracavity laser radiation such that the standing wave is being repeatedly swept back and forth, along an optical axis of the linear resonator, relative to the first nonlinear crystal.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
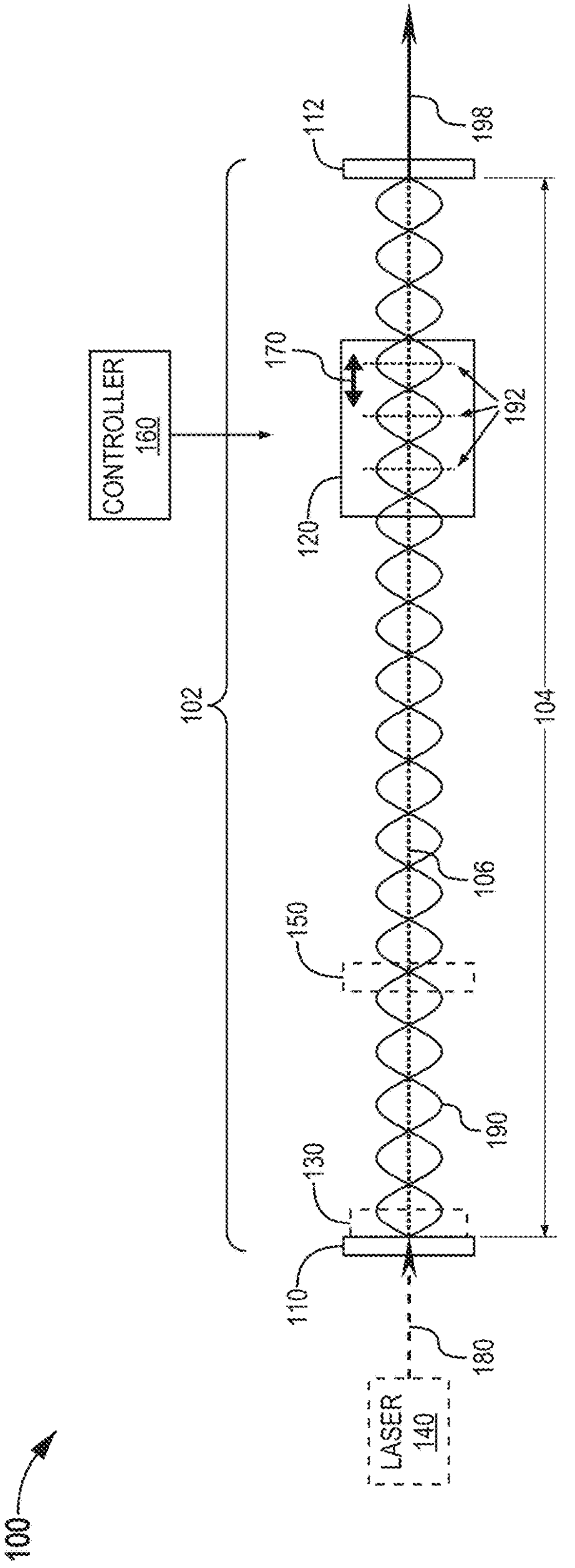
FIG. 1 illustrates a system for frequency conversion in a nonlinear crystal in a linear resonator, according to an embodiment. The linear resonator operates on a single longitudinal mode such that the intracavity radiation forms a standing wave. The system is configured to prevent Bragg grating formation in the nonlinear crystal by repeatedly sweeping the standing wave back and forth relative to the nonlinear crystal.

Referring now to the drawings, wherein like components are designated by like numerals, FIG. 1 illustrates one system 100 for frequency conversion in a nonlinear crystal in a linear resonator operating on a single longitudinal mode. System 100 is configured to prevent Bragg grating formation in the nonlinear crystal. System 100 includes a linear resonator 102 for containing intracavity laser radiation 190 and a nonlinear crystal 120 for frequency converting intracavity radiation 190. Intracavity radiation 190 is typically near-infrared or visible, but may be ultraviolet. Resonator 102 includes two end-mirrors 110 and 112 and has an optical axis 106. Although not shown in FIG. 1, resonator 102 may include additional folding mirrors, in which case optical axis 106 is folded accordingly.

In one embodiment, resonator 102 is a resonant enhancement cavity that receives a portion of an externally generated laser beam 180, for example via one of end-mirrors 110 and 112. In this embodiment, resonator 102 resonantly enhances the in-coupled portion of laser beam 180 to generate intracavity radiation 190, and the average power of intracavity radiation 190 may be orders of magnitude greater than the average power of laser beam 180 incident on resonator 102. System 100 may include an external laser 140 that generates laser beam 180. Another embodiment of system is configured for intracavity frequency conversion. In this embodiment, resonator 102 is a laser resonator that includes an intracavity laser gain medium 130 to generate intracavity radiation 190. Gain medium 130 may be disposed on one of end-mirrors 110 and 112, as depicted in FIG. 1, or in a different location along optical axis 106. In the depicted example, gain medium 130 may be an optically-pumped semiconductor gain medium. System 100 may further include a pump laser (not shown in FIG. 1) that delivers a pump laser beam to gain medium 130.

Resonator 102 is operated on a single longitudinal mode. Intracavity radiation 190 therefore forms a standing wave between end-mirrors 110 and 112. The node-to-node distance of the standing wave is half the wavelength of intracavity radiation 190. In FIG. 1, intracavity radiation 190 is schematically depicted as the envelope of the oscillating electric field of the standing wave.

Resonator 102 may include a spectral filter, for example an etalon 150, that limits oscillation to this single longitudinal mode. In certain implementations, system 100 is capable of switching between longitudinal modes as needed.

Nonlinear crystal 120 is positioned on optical axis 106. Nonlinear crystal 120 frequency-converts at least a portion of intracavity radiation 190 to generate frequency-converted laser radiation 198. Frequency-converted radiation 198 may exit resonator 102 through one of end-mirrors 110 and 112, as shown in FIG. 1. In one embodiment, nonlinear crystal 120 is configured for second-harmonic generation and thus frequency-doubles intracavity radiation 190. In another embodiment, nonlinear crystal 120 is configured for sum- or difference-frequency mixing of intracavity radiation 190 with other input radiation having a different wavelength than intracavity radiation 190. In this embodiment, system 100 may further include a laser that generates the other input radiation to be mixed with intracavity radiation 190 in nonlinear crystal 120.

Nonlinear crystal 120 is made of a photorefractive material, for example lithium triborate (LBO), caesium lithium borate (CLBO), beta barium borate (BBO), lithium niobate (LNBO), potassium dihydrogen phosphate (KDP), potassium dideuterium phosphate (DKDP), or potassium titanyl phosphate (KTP). The standing wave of intracavity radiation 190 has a series of antinodes 192 in nonlinear crystal 120. In the absence of some form of mitigation, the standing wave of intracavity radiation 190 may generate changes in the refractive index in nonlinear crystal 120 where the average power of intracavity radiation 190 is high. Thus, as the intensity of the standing wave along optical axis 106 alternates between nodes and antinodes, the refractive index may spatially alternate between two extremes. This periodic modulation in refractive index along optical axis 106 forms a Bragg grating in nonlinear crystal 120. The periodicity of the Bragg grating matches that of the standing wave in nonlinear crystal 120, and the Bragg grating is therefore partially reflective for intracavity radiation 190. In general, the contrast in such a Bragg grating increases with the average power of intracavity radiation 190 and may become significant when the average intracavity power exceeds 100 watts.

Bragg grating formation is prevented by repeatedly sweeping the standing wave back and forth along optical axis 106 relative to nonlinear crystal 120, as indicated by arrow 170. This sweeping may entail sweeping the standing wave back and forth along optical axis 106 while keeping nonlinear crystal 120 stationary, or sweeping nonlinear crystal 120 back and forth along optical axis 106 while keeping the standing wave stationary.

Figure 2:
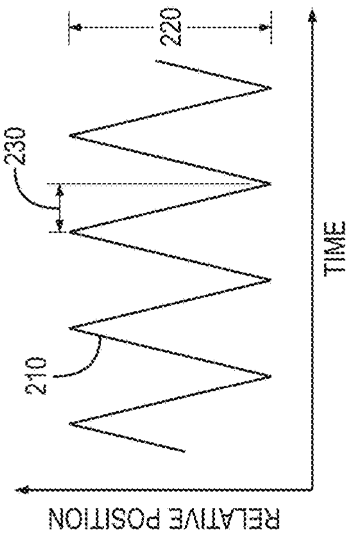
FIG. 2 shows exemplary sweeping of the position of the standing wave of the intracavity radiation relative to the nonlinear crystal of the FIG. 1 system to prevent the standing wave from forming a Bragg grating in the nonlinear crystal.

FIG. 2 shows exemplary sweeping of the position of the standing wave of intracavity radiation 190 along optical axis 106 relative to nonlinear crystal 120 for the purpose of preventing Bragg grating formation. FIG. 2 plots "relative position" 210 as a function of time. Relative position 210 is, for example, the distance along optical axis 106 from one face of nonlinear crystal 120 to a particular node of the standing wave inside nonlinear crystal 120. The sweeping may be periodic with a sweep range 220 and a temporal half-period 230. In the plotted example, relative position 210 is varied according to a triangular sweep pattern. Other viable sweep patterns include sinusoidal and generally smooth patterns. The sweep pattern may be aperiodic.

With suitable choices of sweep pattern, sweep range 220, and half-period 230, it is possible to avoid Bragg grating formation. The sweep range required to avoid Bragg grating formation depends at least on the chosen sweep pattern. A sweep range of half the wavelength of intracavity radiation 190 is sufficient in many situations, although unrelated constraints in some scenarios may require a sweep range of up to a few multiple (e.g., two or three) half-wavelengths of intracavity radiation 190. The maximum tolerable half-period 230 depends on the material of nonlinear crystal 120, the intensity of intracavity radiation 190, and sweep range 220. In a typical scenario, half-period 230 is at least 10 seconds, for example in the range between 10 seconds and 30 minutes or in the range between 1 and 5 minutes. A small sweep range 220 may help prevent undesirable effects, such as misalignment of resonator 102 and mode-hopping. In one example, sweep range 220 is at most three times the wavelength of intracavity radiation 190.

Figure 3:
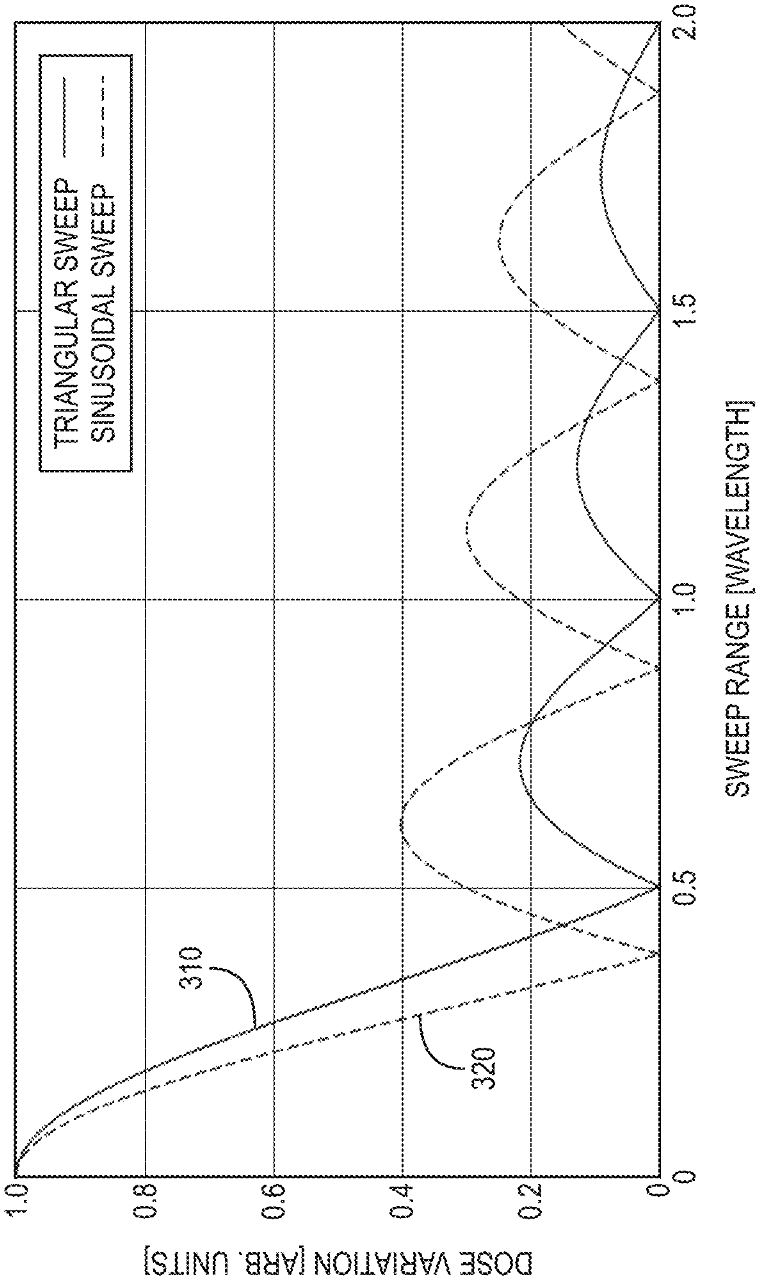
FIG. 3 illustrates spatial variation in irradiation dose deposited in the nonlinear crystal of the FIG. 1 system by the intracavity radiation when the standing wave of the intracavity radiation is swept back and forth relative to the nonlinear crystal using a triangular or sinusoidal sweep pattern.

FIG. 3 illustrates the spatial variation in irradiation dose deposited in nonlinear crystal 120 by intracavity radiation 190 for both a triangular sweep pattern (trace 310, solid line) and a sinusoidal sweep pattern (trace 320, dashed line). For each of the triangular and sinusoidal sweep patterns, FIG. 3 plots the variation in irradiation dose along optical axis 106 as a function of sweep range (e.g., sweep range 220 in FIG. 2). The sweep range is stated in units of wavelength of intracavity radiation 190. The dose variation is the difference between the maxima and minima of the periodically varying irradiation dose along optical axis 106. A high dose-variation is equivalent to a Bragg grating with a high contrast. A dose variation of zero is equivalent to a uniform irradiation dose in nonlinear crystal 120, i.e., elimination of the Bragg grating. The dose variation is indicated in arbitrary units, and the sweep range is indicated in units of the wavelength of intracavity radiation 190. A sweep range of zero corresponds to a worst-case scenario with a stationary spatial relationship between nonlinear crystal 120 and the standing wave of intracavity radiation 190.

Consider first triangular sweeping (trace 310). In this case, the dose variation can be expressed as $$\Delta D = \left|\frac{\sin(2\pi\delta/\lambda)}{2\pi\delta/\lambda}\right|,$$

where δ is the sweep range, e.g., sweep range 220, and A is the wavelength of intracavity radiation 190. As the sweep range is increased from zero (i.e., no sweeping), the dose variation decreases. The dose variation attains the value of zero at each integer multiple of half the wavelength of intracavity radiation 190. Thus, a sweep range of half the wavelength of intracavity radiation 190 is sufficient to prevent Bragg grating formation. More generally, Bragg grating formation can be prevented with a triangular sweep having a sweep range of $$\frac{1}{2}$$

Nλ, where N is a positive integer. The triangular sweep pattern does not need to have the same sweep rate for each sweep between the two extreme positions defined by the sweep range. It is sufficient that each sweep between the two extrema occurs at a uniform sweep rate. This uniform rate may be different for different sweeps.

The triangular sweep may be performed in discrete steps, although the step size may need to be relatively small to avoid creating a disturbance that causes a mode-hop. In the case of stepwise sweeping, a uniform rate may be achieved with equally sized steps and the same amount of time spent at each position. Preferably, the amount of time spent at each position is relatively short in order to keep Bragg grating formation at each position negligible. (For this same reason, sweeping is preferably performed without pausing.) Continuous sweeping is equivalent to stepwise sweeping with an infinitely small step size. Herein, a sweep range of $$\frac{1}{2}$$

Nλ is understood to be a sweep range that equals $$\frac{1}{2}$$

Nλ to within the step size utilized for the sweep.

A purely mathematical consideration indicates that it is possible to eliminate the Bragg grating with a sawtooth sweep pattern. However, a sudden jump from one extreme position to the opposite extreme position may present a disturbance that induces a mode-hop in resonator 102. The sawtooth sweep pattern may therefore be less desirable.

For a sinusoidal sweep pattern (trace 320), the dose variation can be expressed as $$\Delta D = |J_0(2\pi\delta/\lambda)|,$$

where $J_0$ is the zeroth-order Bessel function of the first kind. It is evident that the dose variation attains the value zero for a series of sweep ranges, each somewhat smaller than a respective integer multiple of half the wavelength of intracavity radiation 190. Thus, with a sinusoidal sweep pattern, the Bragg grating can be eliminated with a sweep range that is less than half the wavelength of intracavity radiation 190. However, the dose variation increases more sharply when deviating from the ideal sweep ranges. A triangular sweep pattern may therefore be preferred in cases where such deviation is a concern. As in the case of the triangular sweep pattern, not every sweep of the sinusoidal sweep pattern needs to be performed at the same rate, and the sweeping may be continuous or stepwise.

As evidenced by the examples of FIG. 3, it is possible to completely eliminate Bragg grating formation by repeatedly sweeping the standing wave of intracavity radiation 190 in relation to nonlinear crystal 120. However, more generally, any sweeping of the standing wave of intracavity radiation 190 (apart from discrete jumps by a full period of the standing wave) will at least reduce the refractive index variation of the Bragg grating, as compared to that resulting from a stationary relationship between the standing wave and nonlinear crystal 120. It may be advantageous, though, to utilize a sweep range that is at least a fourth of the wavelength of intracavity radiation 190.

Additionally, Bragg grating formation may be slowed by heating nonlinear crystal 120 to an elevated temperature throughout the frequency-conversion process. The elevated temperature is below the annealing temperature of the material of nonlinear crystal 120 and therefore not sufficient to erase a Bragg grating but may be helpful nevertheless. Fortuitously, in many embodiments of system 100, nonlinear crystal 120 is kept at an elevated temperature for the purpose of achieving phase-matching between intracavity radiation 190 and frequency-converted radiation 198. Commonly, the elevated temperature is at least 50 degrees Celsius or at least 100 degrees Celsius. In a specific example, the elevated temperature is ~150 degrees Celsius for noncritical second-harmonic generation of 1064 nanometers (nm) radiation in LBO. Continuous temperature elevation may allow for relatively slow sweeping of the standing wave of intracavity radiation 190 relative to nonlinear crystal 120. Keeping nonlinear crystal 120 at an elevated temperature may be particularly helpful when operating at parameters, e.g., sweep pattern and sweep range 220, that do not completely eliminate Bragg grating formation.

Referring again to FIG. 1, system 100 includes a controller 160 that acts on one or more elements of resonator 102 to effect the repeated sweeping back and forth of the position of the standing wave relative to nonlinear crystal 120. This repeated sweeping may be achieved in multiple different ways and may, for example, include any one of several techniques discussed below.

Figure 4:
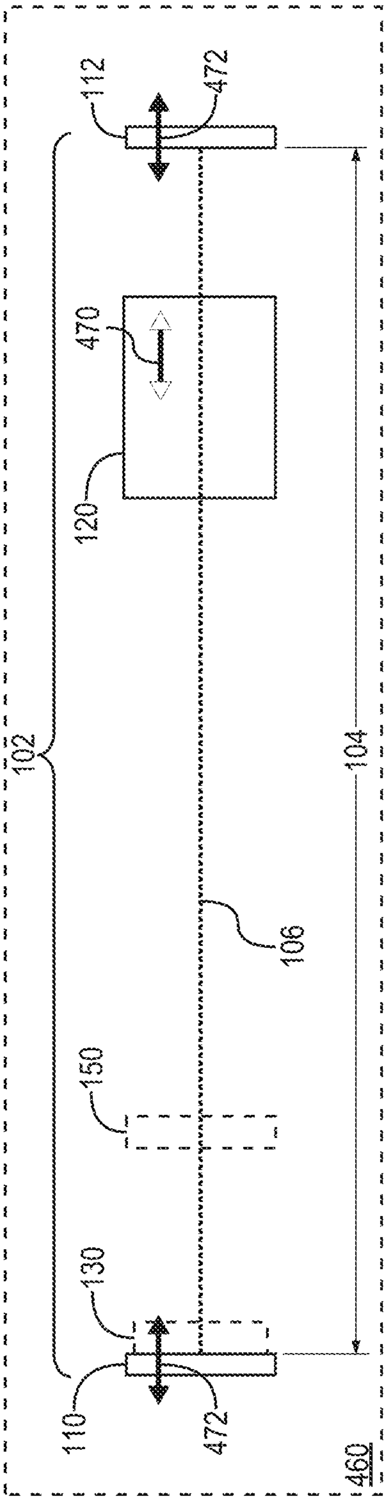
FIG. 4 illustrates exemplary position-dithering techniques to effect repeated back-and-forth sweeping of the standing wave relative to the nonlinear crystal to prevent Bragg grating formation in the FIG. 1 system.

FIG. 4 illustrates exemplary position-dithering techniques to effect the repeated back-and-forth sweeping of the standing wave of intracavity radiation 190 discussed above in reference to FIGS. 1-3. One position-dithering technique, illustrated in FIG. 4, dithers the longitudinal position of nonlinear crystal 120 along optical axis 106, as indicated by arrow 470. In a corresponding embodiment of system 100, nonlinear crystal 120 may be mounted on a piezoelectric actuator driven by controller 160 to translate nonlinear crystal 120 along optical axis 106 relative to a support 460 (e.g., a baseplate) for resonator 102. Two such actuators are discussed below in reference to FIGS. 5A, 5B, and 6.

Another position-dithering technique, illustrated in FIG. 4, dithers the longitudinal positions of both end-mirrors 110 and 112, as indicated by arrows 472. The dithering of the two end-mirrors is performed in a synchronous fashion such that the length 104 of resonator 102 remains constant. Length 104 is a physical length of resonator 102 along optical axis 106 between end-mirrors 110 and 112. In a corresponding embodiment of system 100, each of end-mirrors 110 and 112 may be mounted on a respective piezoelectric actuator controlled by controller 160 to translate the end-mirror along optical axis 106 relative to support 460. Nonlinear crystal 120 remains stationary relative to support 460.

Yet another position-dithering technique, illustrated in FIG. 4, dithers the longitudinal position of only one of end-mirrors 110 and 112, as indicated by the corresponding arrow 472. In embodiments of system 100 implementing gain medium 130 on end-mirror 110, it may be preferred to dither end-mirror 112. Dithering of only a single end-mirror 110 and 112 has the advantage of requiring less hardware than dithering of both end-mirrors 110 and 112. In fact, certain implementations of system 100 have one of end-mirrors 110 and 112 mounted on a piezoelectric actuator in order to tune the resonance frequencies of the resonator, unrelated to the effort to prevent Bragg grating formation. This same piezoelectric actuator, and associated control electronics, may be used to dither the position of the end-mirror for the purpose of preventing Bragg grating formation.

When dithering only a single end-mirror, resonator length 104 is being dithered by the same amount. As a result, the wavelengths of the longitudinal modes of resonator 102 are being modulated. Consider first embodiments of system 100 configured for intracavity frequency conversion and a typical case where length 104 is at least 10 centimeters (cm) and intracavity radiation 190 has a wavelength of 1064 nm. In this case, it may be sufficient to sweep the standing wave by, e.g., 532 nm at the location of nonlinear crystal 120 when using a triangular sweep pattern, or less when using a sinusoidal sweep pattern. If nonlinear crystal 120 is positioned reasonably close to the end-mirror that is being dithered, the end-mirror can be dithered by less than, e.g., one micrometer. The resulting wavelength modulation of intracavity radiation 190 is less than about 0.01 nm. Viewed from a different perspective, the wavelength modulation of intracavity radiation 190 resulting from dithering of only a single end-mirror may be similar in size to a mode-hop between two adjacent longitudinal modes of resonator 102. However, a mode-hop is instantaneous and often unpredictable, whereas the present wavelength modulation is controlled and comparatively slow and smooth. Most applications of frequency-converted radiation 198 intolerant to mode-hops and/or multimode operation are insensitive to this wavelength modulation.

When system 100 is configured for intracavity frequency conversion and implements a spectral filter, it may be necessary to adjust the spectral filter in order to maintain the single longitudinal mode while resonator length 104 is being dithered. For this purpose, system 100 may implement an active feedback look that adjusts the spectral filter, e.g., etalon 150 or a Lyot filter, in response to changes to resonator length 104. The active feedback loop may include a detector that measures a portion of intracavity radiation 190 rejected by the spectral filter.

In embodiments of system 100 configured as resonant enhancement cavities, it may be necessary to modulate the wavelength of external beam 180 to keep resonator 102 resonant with intracavity radiation 190 while resonator length 104 is being dithered. Apart from this aspect, the above considerations discussed for intracavity-frequency-conversion embodiments apply to resonant-enhancement-cavity embodiments as well.

For geometries of resonator 102 involving one or more folding mirrors between end-mirrors 110 and 112, the standing wave of intracavity radiation 190 may be swept back and forth in nonlinear crystal 120 by dithering the position of one or more of these folding mirrors. However, folding-mirror dithering may lead to lateral translation of the beam path in resonator 102. Therefore, end-mirror dithering as depicted in FIG. 4 is typically advantageous over folding-mirror dithering.

In each of the FIG. 4 position-dithering techniques, the distance by which each optical element, chosen for dithering, needs to move to prevent Bragg grating formation may be relatively short, typically between a fraction and a few multiples of the wavelength of intracavity radiation 190. When intracavity radiation 190 is visible, near-infrared, or ultraviolet, it may therefore suffice to dither the optical element(s) by a distance that is no more than a few micrometers. Position-dithering by several micrometers, even tens of micrometers, can be achieved with a piezoelectric actuator without compromising the alignment of resonator 102.

Figure 5B:
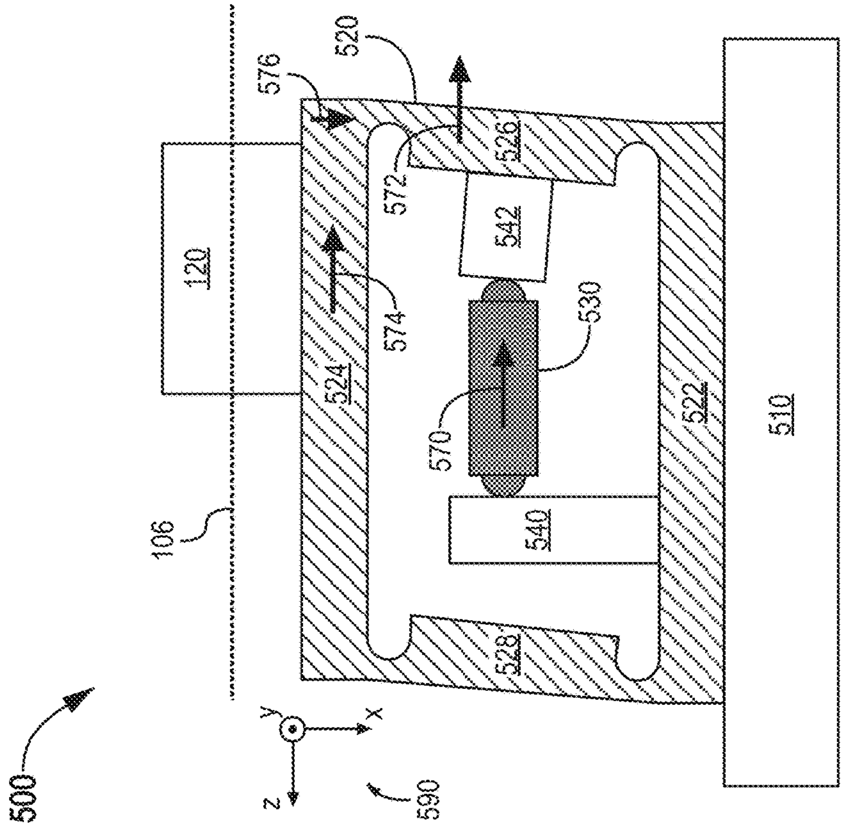
FIGS. 5A and 5B illustrate a piezoelectric actuator for translation of the nonlinear crystal of the FIG. 1 system along the optical axis of the linear resonator, according to an embodiment. The piezoelectric actuator includes a flexure that behaves as a parallelogram. A piezoelectric transducer is disposed inside a space enclosed by the parallelogram to control the angles of the parallelogram.
Figure 5A:
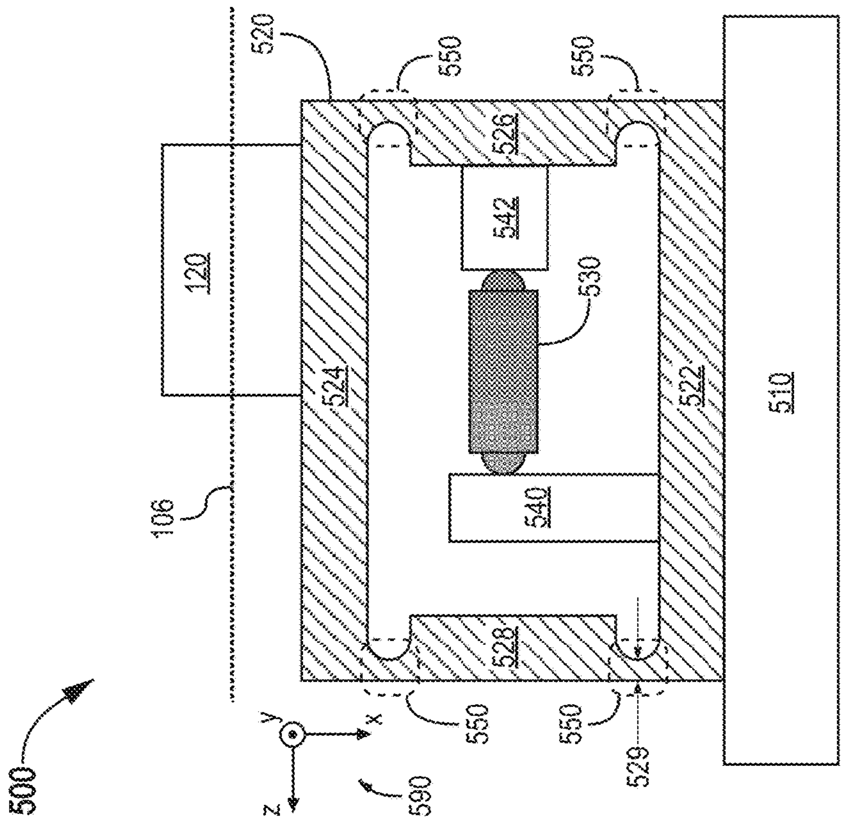

FIGS. 5A and 5B illustrate one piezoelectric actuator 500 for translation of nonlinear crystal 120 along optical axis 106 in system 100. Actuator 500 includes a base 510, a flexure 520, and a piezoelectric transducer 530. Base 510 may be mounted to support 460 (see FIG. 4). FIG. 5A shows actuator 500 in a state where transducer 530 has an initial length. FIG. 5B shows actuator 500 in another state where the length of transducer 530 is extended from the initial length. Actuator 500 may be provided with or without nonlinear crystal 120 mounted thereto.

Flexure 520 includes legs 522, 524, 526, and 528. Leg 522 is affixed to base 510 or integrally formed with base 510. Nonlinear crystal 120, when included, is mounted to leg 524. Legs 522 and 524 are oriented along the z-axis of a cartesian coordinate system 590. In the context of FIGS. 5A and 5B, any reference to x-, y-, z-axes, dimensions, and associated planes pertains to coordinate system 590. When actuator 500 is implemented in system 100, actuator 500 is oriented such that the z-axis is parallel to optical axis 106. Each of legs 526 and 528 connects between legs 522 and 524, and legs 526 and 528 are offset from each other in a direction that is parallel to the z-axis. Flexure 520 may be integrally formed. The actual shapes of legs 522, 524, 526, and 528 may deviate from those shown in FIGS. 5A and 5B.

Legs 522 and 524 are generally parallel to each other, and legs 526 and 528 are generally parallel to each other. Flexure 520 thereby forms a parallelogram. The parallelogram of flexure 520 is parallel to the xz-plane. Base 510 may be mounted to support 460 such that the xz-plane is parallel to the surface of support 460 that supports resonator 102. Alternatively, actuator 500 may be mounted to support 460 such that the yz-plane of coordinate system 590 is parallel to support 460, corresponding to actuator 500 being disposed between support 460 and optical axis 106.

The connections 550 between legs 522, 524, 526, and 528 are less rigid than the legs themselves. For example, as depicted in FIGS. 5A and 5B, connections 550 may have a smaller thickness 529 in the z-dimension than the legs themselves. Transducer 530 is disposed inside the parallelogram, that is, in the space enclosed by legs 522, 524, 526, and 528. Actuator 500 further includes a rigid arm 540 protruding from leg 522 into this enclosed space. Arm 540 may be mounted to leg 522 or integrally formed with leg 522. In alternative embodiments, arm 540 is mounted to or integrally formed with leg 524, or arm 540 is mounted directly to base 510. If base 510 is mounted to support 460, arm 540 may be mounted directly to support 460. Transducer 530 is coupled between arm 540 and leg 526. Depending on the length of transducer 530 and the distance between arm 540 and leg 526, actuator 500 may include one or more spacers to help transducer 530 bridge the gap between arm 540 and leg 526. For example, as depicted in FIGS. 5A and 5B, actuator 500 may include a spacer 542 rigidly coupled to leg 526.

Extension of the length of transducer 530 from the initial length in FIG. 5A to the extended length in FIG. 5B, as indicated by arrow 570 in FIG. 5B, distorts the shape of flexure 520. Specifically, because the position of arm 540 is fixed relative to base 510, transducer 530 forces leg 526 away from arm 540 in the direction indicated by arrow 572. However, flexure 520 continues to form a parallelogram in the xz-dimensions, only characterized by different angles. Distortion of flexure 520 translates but does not rotate leg 524. As a result, extension of transducer 530 leads to translation of nonlinear crystal 120. When the extension of transducer 530 is much smaller than the offset between legs 522 and 524 in the x-dimension, the translation of leg 524 is almost purely along optical axis 106 (along the z-axis) in the direction indicated by arrow 574. As discussed above, it is usually sufficient to translate nonlinear crystal 120 by a distance that is no more than a few micrometers, maybe even less than a micrometer. In one implementation, the offset between legs 522 and 524 in the x-dimension is at least 5 millimeters (mm) long. In this implementation, translation of nonlinear crystal 120 orthogonally to optical axis 106 (along the x-axis), as indicated by arrow 576, is negligible.

It may be helpful to configure flexure 520 to be rigid against deformation out of the xz-dimensions, or at least more rigid against deformation out of the xz-dimensions than against deformation within the xz-dimensions. Thus, in one embodiment, the smallest height of legs 522, 524, 526, and 528, as well as connections 550, in the y-dimension exceeds (a) thickness 529 of connections 550 and optionally also (b) the thickness in the xz-dimensions of each of legs 522, 524, 526, and 528. The height of flexure 520 in the y-dimension may be uniform. For example, flexure 520 may be manufactured from a planar substrate with top and bottom surfaces parallel to the xz-plane.

In the example depicted in FIGS. 5A and 5B, the initial length of transducer 530 corresponds to the parallelogram of flexure 520 being rectangular, and extension of the length of transducer 530 causes the parallelogram of flexure 520 to take on a non-rectangular shape. In another example, the parallelogram of flexure 520 is non-rectangular when transducer 530 is at its initial length, and the parallelogram of flexure 520 is rectangular or non-rectangular when the length of transducer 530 is extended.

Figure 6:
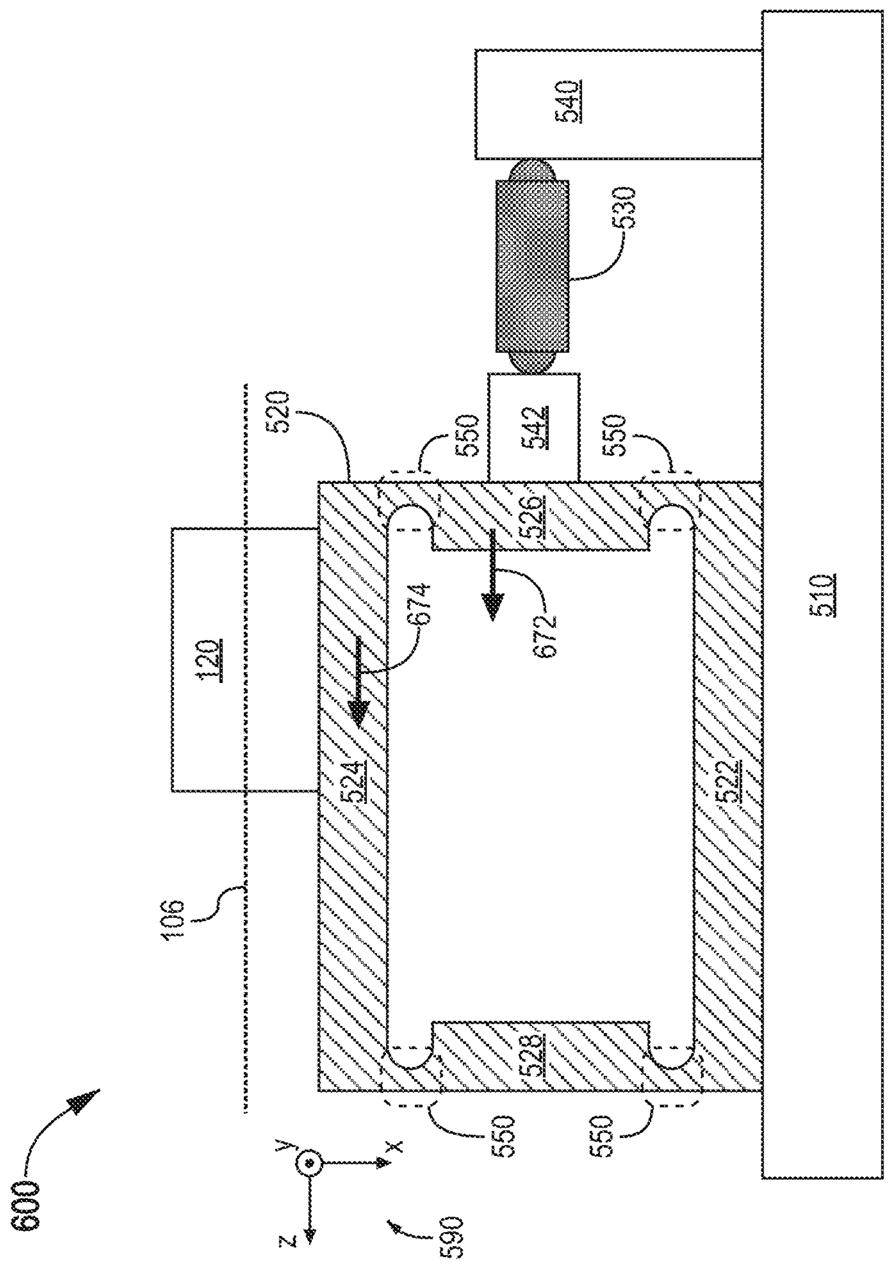
FIG. 6 illustrates another piezoelectric actuator for translation of the nonlinear crystal of the FIG. 1 system along the optical axis of the linear resonator, according to an embodiment. The FIG. 6 actuator is similar to the FIG. 5 actuator except that the transducer is disposed outside the parallelogram.

FIG. 6 illustrates another piezoelectric actuator 600 for translation of nonlinear crystal 120 along optical axis 106 in system 100. Actuator 600 is similar to actuator 500 except that transducer 530 and arm 540 are located outside the parallelogram of flexure 520. In actuator 600, arm 540 is mounted to or integrally formed with base 510, or base 510 and arm 540 are both mounted to support 460 (see FIG. 4). Transducer 530 is coupled between arm 540 and leg 526, optionally together with one or more spacers such as spacer 542 (as discussed above in reference to FIGS. 5A and 5B). Arm 540 is positioned such that arm 540 and leg 528 are on opposite sides of leg 526, with respect to the z-axis. In other words, leg 526 is located between leg 528 and arm 540.

Extension of the length of transducer 530 pushes leg 526 in the direction indicated by arrow 672. This results in changes to the angles of the parallelogram of flexure 520, and translation of leg 524 and nonlinear crystal 120 in the direction indicated by arrow 674.

Comparing actuators 500 and 600, their performance properties are similar but the actuators differ in form factor. When flexure 520 is of a size that allows for positioning of transducer 530 and arm 540 inside the space enclosed by the parallelogram of flexure 520, actuator 500 may offer a more compact solution than actuator 600.

Figure 7:
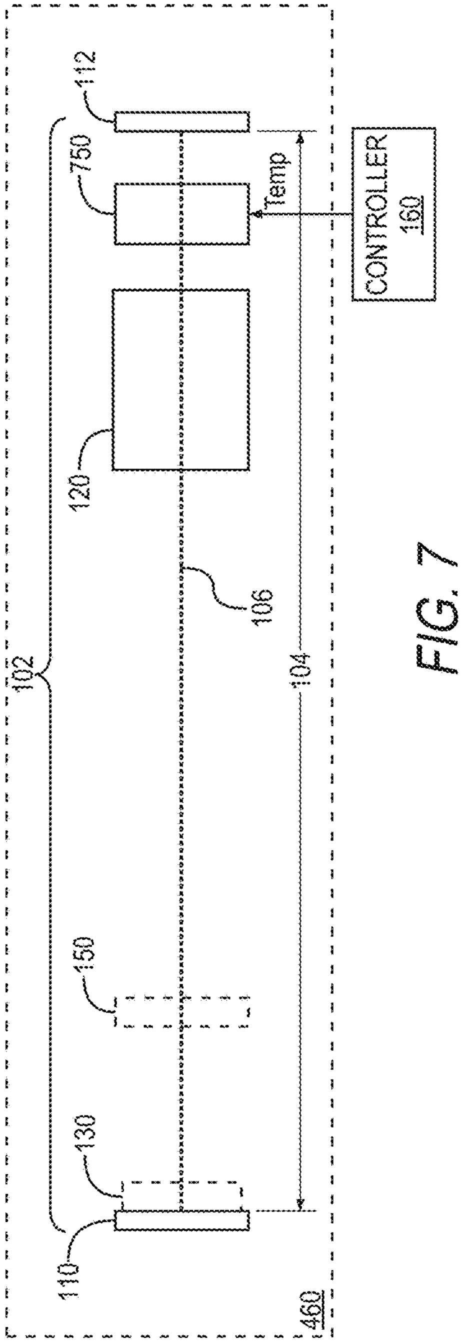
FIG. 7 illustrates an exemplary temperature-dithering technique to effect the repeated back-and-forth sweeping of the standing wave relative to the nonlinear crystal to prevent Bragg grating formation in the FIG. 1 system.

FIG. 7 illustrates a temperature-dithering technique to effect the repeated back-and-forth sweeping of the standing wave of intracavity radiation 190 discussed above in reference to FIGS. 1-3. This temperature-dithering technique dithers the temperature of a transmissive optical element to dither the optical path length of resonator 102 between end-mirrors 110 and 112. In a corresponding embodiment of system 100, depicted in FIG. 7, resonator 102 includes a transmissive optical element 750, and controller 160 is configured to dither the temperature of transmissive optical element 750. Controller 160 may dither the temperature of transmissive optical element 750 by adjusting a heater in thermal coupling with transmissive optical element 750.

Optical element 750 has a non-zero thermal expansion coefficient, and/or its refractive index is temperature sensitive. Therefore, when controller 160 dithers the temperature of transmissive optical element 750, the optical path length of transmissive optical element 750, along optical axis 106, is being dithered accordingly. Dithering of the optical path length of transmissive optical element 750 amounts to dithering of the optical path length of resonator 102. The physical length 104 of resonator 102 may remain unchanged. However, dithering of the optical path length nevertheless results in the standing wave of intracavity radiation 190 being swept back and forth in nonlinear crystal 120. More specifically, dithering of the optical path length amounts to modulation of the wavelengths of all longitudinal modes of resonator 102. When resonator 102 is configured for intracavity frequency conversion, wavelength modulation of the longitudinal modes of resonator 102 results in modulation of the period of the standing wave of intracavity radiation 190. The nodes and antinodes of the standing wave are thereby repeatedly swept back and forth in nonlinear crystal 120. The same happens when resonator 102 is configured as a resonance enhancement cavity, provided that the wavelength of external beam 180 is modulated synchronously with the temperature dithering of transmissive optical element 750 to keep external beam 180 resonant with the selected longitudinal mode of resonator 102.

For the same reasons discussed above in reference to FIG. 4, the wavelength modulation resulting from temperature dithering of nonlinear crystal 120 is inconsequential in many scenarios. In embodiments of system 100 implementing a spectral filter, e.g., etalon 150 or a Lyot filter, active adjustment of the spectral filter may be necessary to maintain the single longitudinal mode while the temperature of transmissive optical element 750 is being dithered. This spectral filter adjustment is similar to that discussed above in reference to position-dithering techniques of FIG. 4 that dither resonator length 104.

The FIG. 7 temperature-dithering technique may be extended to dithering the temperature of more than one optical element in resonator 102 to effect the desired optical path length dithering. However, temperature dithering of only a single element is simpler. Furthermore, the amount of optical path length dithering required to prevent Bragg grating formation can easily be achieved with a single transmissive optical element. In one example, transmissive optical element 750 is made of fused silica, an optical glass, or a transmissive crystal (e.g., calcium fluoride or sapphire). When transmissive optical element 750 is made of fused silica, a thickness of about 10 mm, and temperature dithering by about 10 degrees Kelvin is sufficient to sweep the standing wave of intracavity radiation 190 by half a wavelength in nonlinear crystal 120, when the wavelength of intracavity radiation 190 is 1064 nm.

The behavior of resonator 102 and frequency-conversion in nonlinear crystal 120 may benefit from the portion of transmissive optical element 750, intersected by intracavity radiation 190, being in thermal equilibrium. Thus, it may be advantageous to dither the temperature of transmissive optical element 750 relatively slowly. In one scenario, half-period 230 (see FIG. 2) is at least a minute, e.g., in the range between one and five minutes.

The temperature-dithering technique of FIG. 7 may be generalized to techniques that dither the optical path length of resonator 102 between end-mirrors 110 and 112. For example, the optical path length of resonator 102 may be dithered by modulating a gas pressure in resonator 102, or by translating one or more wedges across the beam path within resonator 102.

Figure 8:
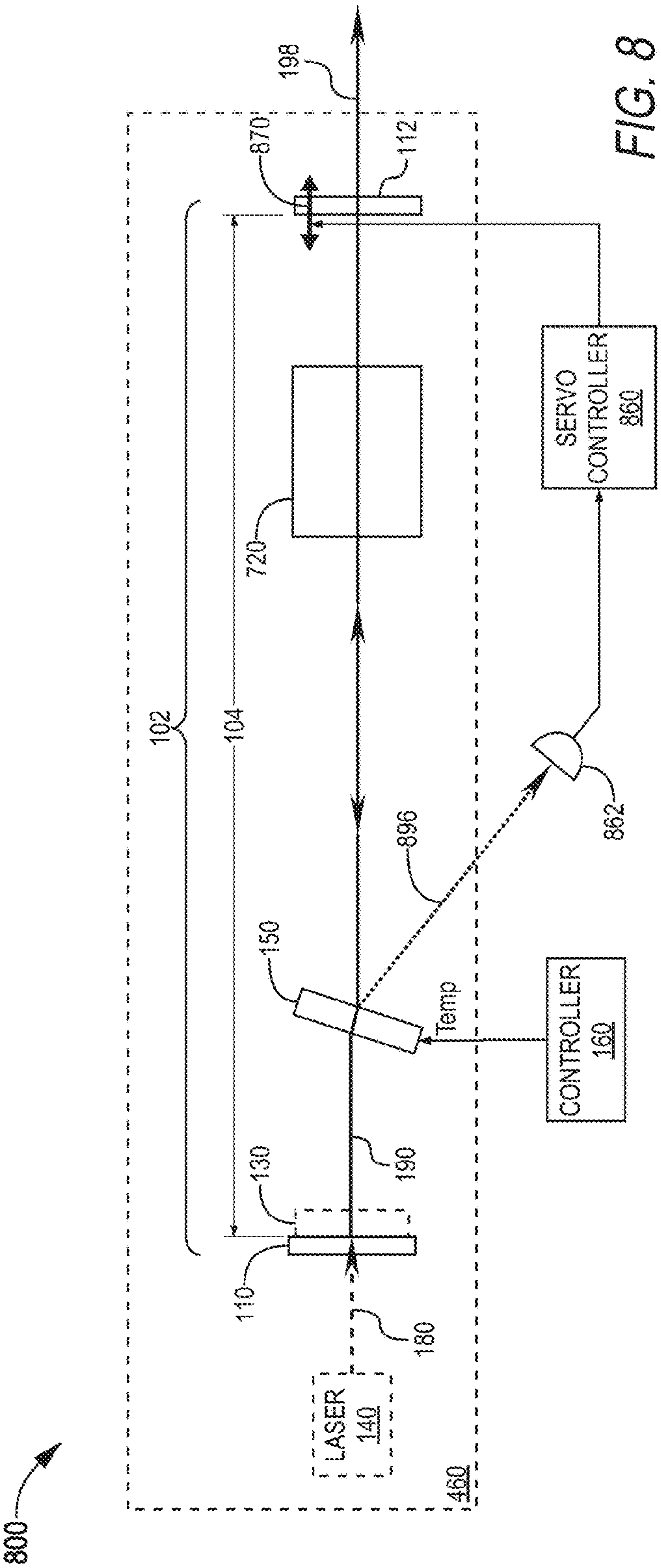
FIG. 8 illustrates a system for frequency conversion in a nonlinear crystal in a linear resonator, that drives prevention of Bragg grating formation by dithering a reference wavelength to which the intracavity laser radiation of the linear resonator is locked, according to an embodiment.

FIG. 8 illustrates a system 800 which is an embodiment of system 100 that drives prevention of Bragg grating formation by dithering the temperature of etalon 150. The temperature dithering of etalon 150 effects the repeated back-and-forth sweeping of the standing wave of intracavity radiation 190 discussed above in reference to FIGS. 1-3.

In system 800, controller 160 is configured to dither the temperature of etalon 150. Etalon 150 imposes a wavelength-dependent loss in resonator 102. This wavelength-dependent loss forces resonator 102 to operate on a single longitudinal mode of resonator 102 that is at or near a resonance wavelength of etalon 150 where the loss imposed by etalon 150 is at a minimum (at least a local minimum). This resonance wavelength depends on the temperature of etalon 150. Etalon 150 thereby defines a temperature-sensitive reference wavelength. Temperature dithering of etalon 150 amounts to modulation of this reference wavelength. System 800 implements a servo loop that locks the wavelength of intracavity radiation 190 to the reference wavelength defined by etalon 150, optionally with a fixed wavelength offset therebetween. Thus, temperature dithering of etalon 150 results in modulation of the wavelength of intracavity radiation 190, whereby the standing wave of intracavity radiation 190 sweeps repeatedly back and forth along optical axis 106 in nonlinear crystal 120. In embodiments of system 800 where resonator 102 is a resonance enhancement cavity, the servo loop may act on the wavelength of external beam 180 to keep the wavelength of intracavity radiation 190 locked to the reference wavelength.

In the depicted example of system 800, the servo loop includes a detector 862 and a servo controller 860. Detector 862 monitors a portion 896 of intracavity radiation 190 that is rejected by etalon 150. Measurements of rejected portion 896 obtained by detector 862 are sensitive to the offset between the wavelength of intracavity radiation 190 and the reference wavelength. (One example of how to obtain and utilize such measurements is disclosed in U.S. Pat. No. 11,283,237 issued on Mar. 22, 2022 to Qize Shu, which is incorporated herein by reference in its entirety.) Based upon these measurements, servo controller 860 adjusts the longitudinal position of end-mirror 112 (or, alternatively, end-mirror 110) to maintain a constant offset or no offset between the wavelength of intracavity radiation 190 and the reference wavelength defined by etalon 150. In response to temperature dithering of etalon 150 by controller 160, servo controller 860 therefore dithers resonator length 104. The dithering technique of the depicted example of system 800 is equivalent to driving the single-end-mirror position-dithering technique of FIG. 4 with servo-controlled position-dithering of the single end-mirror in response to temperature dithering of etalon 150 (as indicated by arrow 870).

The technique for preventing Bragg grating formation in system 800 is based on (a) controlling resonator length 104 to lock the wavelength of intracavity radiation 190 to a reference wavelength defined by etalon 150, and then (b) modulating this reference wavelength to drive dithering of resonator length 104. This technique is readily generalized to use of reference wavelengths derived from other sources than etalon 150. In such a more general embodiment, a servo controller adjusts resonator length 104 to lock the wavelength of intracavity radiation 190 to a reference wavelength, and then (b) modulates the reference wavelength to force the servo controller to dither resonator length 104. In one example, a parameter related to the wavelength of intracavity radiation 190 is measured and locked to a set-point, whereby the wavelength of intracavity radiation 190 is locked to a reference wavelength corresponding to this set-point. The set-point is modulated while the servo controller adjusts the position of an end-mirror of resonator 102 to maintain a fixed offset or no offset between the set-point and the measured wavelength-related parameter of intracavity radiation 190. Another similar embodiment measures a parameter related to the wavelength of frequency-converted radiation 198, instead of intracavity radiation 190, and locks this parameter to a set-point, whereby the wavelength of intracavity radiation 190 is indirectly locked to a reference wavelength corresponding to the set-point. For non-thermally mediated modulation techniques, such as techniques that modulate a set-point, it may be possible to modulate the reference wavelength faster. In one example, the reference wavelength is scanned between a shortest and a longest wavelength over a time span of at least ten seconds.

Figure 9:
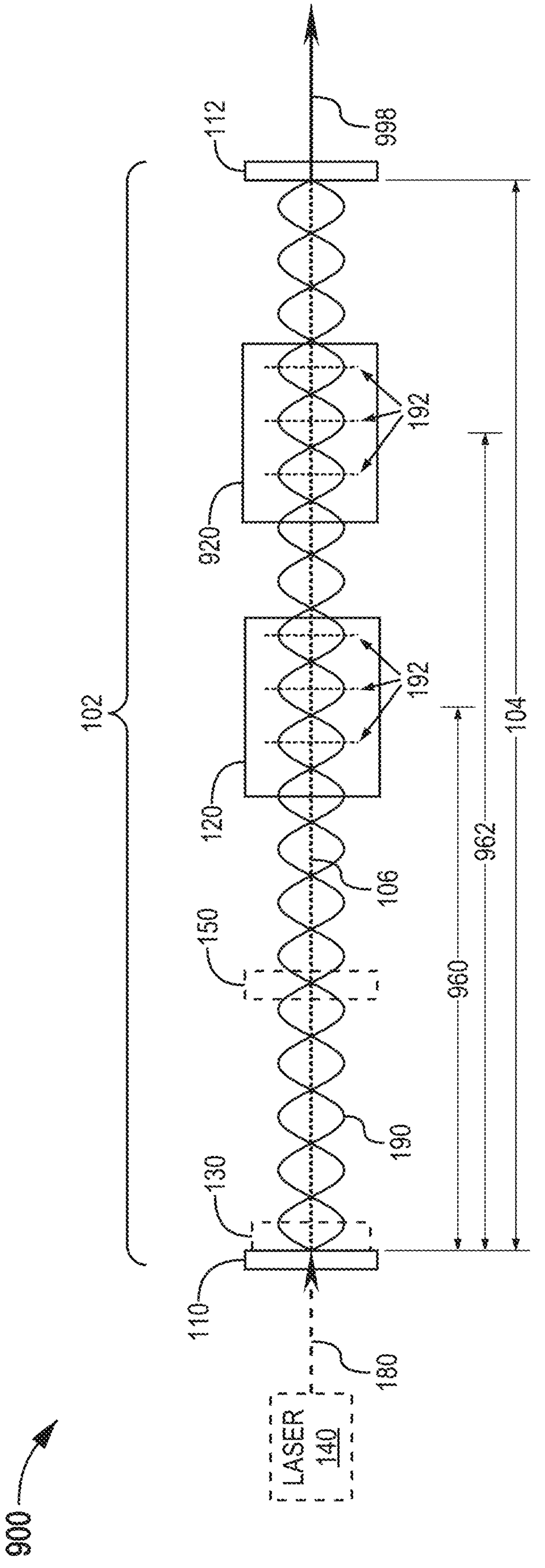
FIG. 9 illustrates a system for two-stage frequency-conversion in two nonlinear crystals in a linear resonator, according to an embodiment. The system is configured to prevent Bragg grating formation in both of these two nonlinear crystals.

FIG. 9 illustrates one system 900 for two-stage frequency-conversion in two nonlinear crystals in a linear resonator. System 900 is configured to prevent Bragg grating formation in both of these two nonlinear crystals. System 900 is an embodiment of system 100 that further includes a second nonlinear crystal 920 in resonator 102. In nonlinear crystal 920, frequency-converted radiation generated in nonlinear crystal 120 undergoes sum-frequency mixing with intracavity radiation 190 to generate twice-frequency-converted radiation 998. In one example, nonlinear crystal 120 generates the second harmonic of intracavity radiation 190, and nonlinear crystal 920 generates the third harmonic of intracavity radiation 190 from sum-frequency mixing between intracavity radiation 190 and the second harmonic generated in nonlinear crystal 120. Each of the position-dithering techniques, temperature-dithering techniques, and more general optical-path-length-dithering techniques discussed above may be configured to also prevent Bragg grating formation in nonlinear crystal 920.

Consider first the position-dithering technique of FIG. 4 that dithers the position of nonlinear crystal 120 to prevent a Bragg grating from forming therein. This technique may be extended to also dither nonlinear crystal 920. For example, each of nonlinear crystals 120 and 920 may be mounted on a respective instance of piezoelectric actuator 500 or 600. The two crystals may or may not be dithered synchronously and may or may not be dithered in the same sweep pattern. However, the considerations discussed above for how to best dither nonlinear crystal 120, in terms of choice of sweep pattern and range, apply to nonlinear crystal 920 as well.

In the position-dithering technique of FIG. 4 that dithers end-mirrors 110 and 112 synchronously, the dithering required to prevent Bragg grating formation in nonlinear crystal 120 automatically prevents Bragg grating formation in nonlinear crystal 920 as well.

Consider now (a) the position-dithering technique of FIG. 4 that dithers only a single end-mirror of resonator 102, (b) the temperature-dithering technique of FIG. 7, (c) the more general optical-path-length dithering techniques discussed above in reference to FIG. 7, and (d) the techniques driven by dithering of a reference wavelength discussed above in reference to FIG. 8. In these techniques, it is possible to position each of nonlinear crystals 120 and 920 to prevent Bragg grating formation therein. For example, when dithering end-mirror 112 with a triangular sweep pattern, nonlinear crystal 120 may be positioned such that antinodes 192 of the standing wave at nonlinear crystal 120 are subject to a sweep range $$\frac{1}{2}$$

$N\lambda$, wherein $\lambda$ is the wavelength of intracavity radiation 190 and N is a positive integer. Concurrently, nonlinear crystal 920 may be positioned such that antinodes 192 of the standing wave at nonlinear crystal 920 are subject to a sweep range $$\frac{1}{2}$$

$M\lambda$, wherein $\lambda$ is the wavelength of intracavity radiation 190 and M is a positive integer that is different from N. In the embodiment depicted in FIG. 9, nonlinear crystals 120 and 920 are at respective distances 960 and 962 from end-mirror 110 while the longitudinal position of end-mirror 112 is being dithered. In one example of this embodiment, distance 962 may be twice as long as distance 960, while the sweep range in nonlinear crystal 120 is $$\frac{1}{2}$$

$\lambda$ and the sweep range in nonlinear crystal 920 is $\lambda$. In another similar example of the depicted embodiment, distance 962 may be 50% longer than distance 960, while the sweep range in nonlinear crystal 120 is A and the sweep range in nonlinear crystal 920 is $$\frac{3}{2}$$

$\lambda$.

The present invention is described above in terms of a preferred embodiment and other embodiments. The invention is not limited, however, to the embodiments described and depicted herein. Rather, the invention is limited only by the claims appended hereto.

What is claimed is:

1. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator; and repeatedly sweeping the standing wave back and forth, along an optical axis of the linear resonator, relative to the first nonlinear crystal;

wherein the repeatedly sweeping step includes completing a sweep of position of the standing wave, relative to the first nonlinear crystal, between two extrema in no less than ten seconds.

2. The method of claim 1, wherein the repeatedly sweeping step includes a step of dithering position of one or more optical elements of the linear resonator.

3. The method of claim 2, wherein the dithering step dithers position along the optical axis of a single one of the first and second end-mirrors, resulting in dithering of a length of the linear resonator between the first and second end-mirrors.

4. The method of claim 3, further comprising a step of adjusting a spectral filter of the linear resonator in response to changes to the length of the linear resonator effected by the dithering step, so as to maintain the single longitudinal mode during said dithering of the length of the linear resonator.

5. The method of claim 2, wherein the dithering step dithers position along the optical axis of the first nonlinear crystal.

6. The method of claim 1, wherein the repeatedly sweeping step includes dithering temperature of a transmissive optical element disposed in the linear resonator to dither an optical path length of the transmissive optical element along the optical axis.

7. The method of claim 1, wherein the repeatedly sweeping step sweeps the standing wave back and forth relative to the first nonlinear crystal by a sweep range of at least a fourth of a wavelength of the intracavity laser radiation in the first nonlinear crystal.

8. The method of claim 1, further comprising:

generating a laser beam in a laser source external to the linear resonator; and coupling at least a portion of the laser beam into the linear resonator to form the intracavity laser radiation.

9. The method of claim 1, wherein the first nonlinear crystal includes lithium triborate.

10. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator; and repeatedly sweeping the standing wave back and forth, along an optical axis of the linear resonator, relative to the first nonlinear crystal;

wherein the repeatedly sweeping step includes dithering a respective position, along the optical axis, of each of the first and second end-mirrors in synchrony with each other to maintain a constant length of the linear resonator between the first and second end-mirrors.

11. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator; and repeatedly sweeping the standing wave back and forth, along an optical axis of the linear resonator, relative to the first nonlinear crystal;

wherein the repeatedly sweeping step includes dithering an optical path length of the linear resonator between the first and second end-mirrors while maintaining a constant physical length of the linear resonator between the first and second end-mirrors.

12. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator; and repeatedly sweeping the standing wave back and forth, along an optical axis of the linear resonator, relative to the first nonlinear crystal;

wherein the repeatedly sweeping step sweeps the standing wave back and forth relative to the first nonlinear crystal by a sweep range of an integer multiple of half a wavelength of the intracavity laser radiation in the first nonlinear crystal, and wherein each sweep between two extrema defined by the sweep range is characterized by a uniform rate.

13. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator; and repeatedly sweeping the standing wave back and forth, along an optical axis of the linear resonator, relative to the first nonlinear crystal;

wherein the repeatedly sweeping step sweeps the standing wave back and forth relative to the first nonlinear crystal by a sweep range of half a wavelength of the intracavity laser radiation in the first nonlinear crystal, and wherein each sweep between two extrema defined by the sweep range is characterized by a uniform rate.

14. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator;

repeatedly sweeping the standing wave back and forth, along an optical axis of the linear resonator, relative to the first nonlinear crystal; and frequency mixing at least a portion of frequency-converted laser radiation, generated in the frequency converting step, with at least a portion of the intracavity laser radiation in a second nonlinear crystal in the linear resonator, and wherein the repeatedly sweeping step causes repeated back-and-forth sweeping of the standing wave, along the optical axis, relative to the second nonlinear crystal.

15. The method of claim 14, wherein:

the repeatedly sweeping step includes a step of dithering position along the optical axis of a single end-mirror, selected from the first and second end-mirrors, resulting in modulation of a length of the linear resonator between the first and second end-mirrors, the modulation causing repeated back-and-forth sweeping of the standing wave by a first sweep range in the first nonlinear crystal and a second sweep range in the second nonlinear crystal, the dithering step dithers the position of the single end-mirror between two extrema at a uniform rate, and respective positions of the first and second nonlinear crystals are such that (a) the first sweep range is a first integer multiple of half a wavelength of the intracavity laser radiation in the first nonlinear crystal and (b) the second sweep range is a second integer multiple of half a wavelength of the intracavity laser radiation in the second nonlinear crystal, the second integer being different from the first integer.

16. The method of claim 14, wherein the repeatedly sweeping step dithers a respective position, along the optical axis, of each of the first and second nonlinear crystals.

17. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator; and repeatedly sweeping the standing wave back and forth, along an optical axis of the linear resonator, relative to the first nonlinear crystal;

wherein the repeatedly sweeping step sweeps position of the standing wave, relative to the first nonlinear crystal, between two extrema at a uniform rate.

18. A method for frequency conversion in a single-longitudinal-mode linear resonator, comprising steps of:

frequency converting at least a portion of intracavity laser radiation in a first nonlinear crystal disposed in a linear resonator, the intracavity laser radiation being in a single longitudinal mode of the linear resonator and forming a standing wave between first and second end-mirrors of the linear resonator;

repeatedly sweeping the standing wave back and forth, along an optical axis of the linear resonator, relative to the first nonlinear crystal; and generating the intracavity laser radiation in a laser gain medium in the linear resonator.

19. The method of claim 18, wherein the laser gain medium is disposed on the first end-mirror, and the repeatedly sweeping step dithers position of the second end-mirror or the first nonlinear crystal to sweep the standing wave back and forth with respect to the first nonlinear crystal.

* * * * *